United States Patent
Treffer

(10) Patent No.: US 12,097,836 B2
(45) Date of Patent: Sep. 24, 2024

(54) VEHICLE BRAKE SYSTEM AND METHOD FOR OPERATING A VEHICLE BRAKE SYSTEM

(71) Applicant: AUDI AG, Ingolstadt (DE)

(72) Inventor: Ulrich Treffer, Neustadt a. d. Donau (DE)

(73) Assignee: AUDI AG, Ingolstadt (DE)

( * ) Notice: Subject to any disclaimer, the term of this patent is extended or adjusted under 35 U.S.C. 154(b) by 408 days.

(21) Appl. No.: 17/624,729

(22) PCT Filed: May 13, 2020

(86) PCT No.: PCT/EP2020/063284
§ 371 (c)(1),
(2) Date: Jan. 4, 2022

(87) PCT Pub. No.: WO2021/008755
PCT Pub. Date: Jan. 21, 2021

(65) Prior Publication Data
US 2022/0250594 A1    Aug. 11, 2022

(30) Foreign Application Priority Data

Jul. 17, 2019 (DE) .................... 10 2019 210 563.7

(51) Int. Cl.
*B60T 8/1766* (2006.01)
*B60L 7/26* (2006.01)
*B60T 8/172* (2006.01)

(52) U.S. Cl.
CPC .............. *B60T 8/1766* (2013.01); *B60L 7/26* (2013.01); *B60T 8/172* (2013.01); *B60T 2240/00* (2013.01); *B60T 2270/604* (2013.01)

(58) Field of Classification Search
None
See application file for complete search history.

(56) References Cited

U.S. PATENT DOCUMENTS 5,700,074 A * 12/1997 Sugimoto ............. B60T 8/4275
   303/186
6,510,372 B1    1/2003 Zenzen et al.
(Continued)

FOREIGN PATENT DOCUMENTS

CN    102837687 A    12/2012
CN    104773150 A    7/2015
(Continued)

OTHER PUBLICATIONS

German Office Action issued on Apr. 16, 2020 in corresponding German Application No. 10 2019 210 563.7; 16 pages; Machine translation attached.

(Continued)

*Primary Examiner* — Peter D Nolan
*Assistant Examiner* — Michael F Whalen
(74) *Attorney, Agent, or Firm* — Maier & Maier, PLLC

(57) ABSTRACT

A brake system in a motor vehicle, the friction brake system of which, on the front and rear wheels, each case including vehicle wheel brakes which can be actuated via an electronic control device which includes an axle-specific braking force distributor unit by which a front axle target deceleration and a rear axle target deceleration can be determined from a friction brake system target deceleration, and which includes a wheel-specific braking force distributor unit by which front wheel target decelerations can be determined from the front axle target deceleration, and rear wheel target decelerations can be determined from the rear axle target deceleration, on the basis of which the wheel-specific braking force distributor unit generates control signals for the actuation of the vehicle wheel brakes.

16 Claims, 2 Drawing Sheets

(56) References Cited

U.S. PATENT DOCUMENTS

2007/0024114 A1   2/2007 Narita et al.
2015/0367824 A1*  12/2015 Betz ..................... B60T 8/1766
                                                    701/70

FOREIGN PATENT DOCUMENTS

| CN | 109693654 A    | 4/2019  |
|----|----------------|---------|
| DE | 19624491 A1    | 1/1997  |
| DE | 19620584 A1    | 11/1997 |
| DE | 19624491 C2    | 2/2002  |
| DE | 19620584 B4    | 11/2005 |
| DE | 102006035085 A1| 3/2007  |
| DE | 102006035085 B4| 1/2012  |

OTHER PUBLICATIONS

International Search Report and Written Opinion issued on Sep. 15, 2020 in corresponding application No. PCT/EP2020/063284; 15 pgs; Machine translation attached.
International Preliminary Report on Patentability issued on Jan. 18, 2022, in corresponding International Application No. PCT/EP2020/063284; 8 pages.
Office Action issued on Mar. 22, 2024, in corresponding Chinese Application No. 202080051097.2, 18 pages.

* cited by examiner

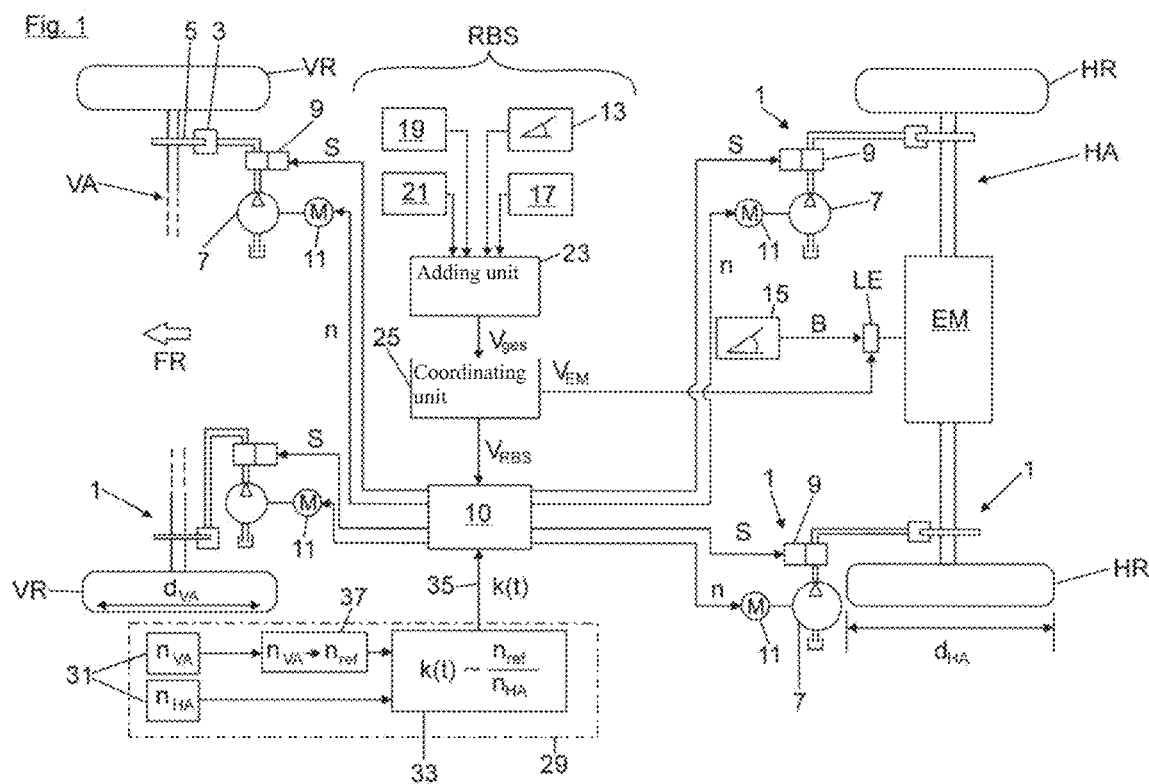

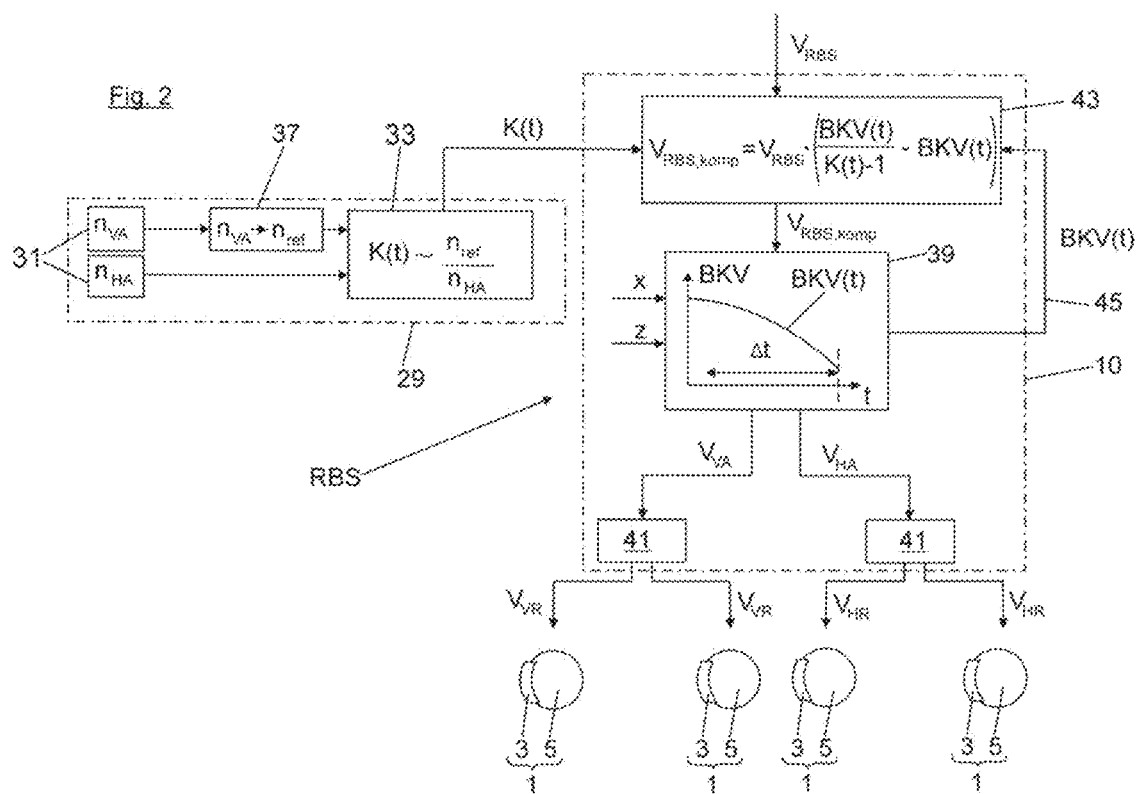

VEHICLE BRAKE SYSTEM AND METHOD FOR OPERATING A VEHICLE BRAKE SYSTEM

FIELD

The invention relates to a vehicle brake system and to a method for operating such a brake system.

BACKGROUND

In order to increase the efficiency and range, braking actions of the vehicle are carried out by an electric drive in generator operation (i.e., recovery operating mode), to the extent that certain limiting conditions are met. These braking actions relate both to braking actions initiated by the driver by means of operating elements and the brake actuation device and also to decelerations demanded by driver assistance systems, emergency brake functions and autonomous driving systems.

For blending-capable brake systems, instead of the friction brake, it is possible to generate the required braking force entirely or partially with the electric drive. Thus, in order to achieve a high efficiency, as a function of the drive design, a deviation from the installed braking force distribution of the friction brake system is usually necessary. This variable braking force distribution from the friction brake system plus the electric drive is open loop controlled as a function of driving dynamics variables and as a function of the driving status. In order to implement an optimal braking force distribution, brake systems moreover exist in which the braking force distribution of the friction brake system can be open loop controlled or closed loop controlled. The braking force distribution is calculated by means of wheel circumferences firmly parameterized in the control device.

A vehicle brake system according to the preamble comprises a (brake-by-wire) friction brake system with vehicle wheel brakes on the front axle wheels and the rear axle wheels of the vehicle. They can be actuated via an electronic control device. The electronic control device comprises, as program components, an axle-specific braking force distributor unit and a wheel-specific braking force distributor unit. By means of the axle-specific braking force distributor unit, on the basis of a friction brake system target deceleration, a front axle target deceleration and a rear axle target deceleration are determined. The wheel-specific braking force distributor unit, which is downstream in terms of signaling, calculates wheel-selective vehicle wheel target decelerations for the front and rear wheels from the front axle target deceleration and from the rear axle target deceleration. In addition, on the basis of these wheel-selective vehicle wheel target decelerations, the wheel-specific braking force distributor unit generates corresponding control signals (for example, rotational speed signal and control valve signal) for the actuation of the respective vehicle wheel brakes.

In the prior art, the braking force distribution occurs with a preset wheel circumference ratio between the front axle and the rear axle, which is unchangeably stored in the control device.

If the average wheel circumference ratio existing in the vehicle on the front and rear axles does not correspond to the fixed wheel circumference ratio preset in the control device, a change of the braking force acting on the front axle and rear axle wheels also results from a change of the braking force distribution. This braking force change negatively influences the deceleration constancy due to a deviating wheel circumference ratio. The longitudinal force variation is directly proportional to the erroneously assumed wheel circumference ratio between the front and rear axle and can lead to a clear deceleration variation in braking force distribution, which can result in comfort issues for the vehicle occupants.

From DE 10 2006 035 085 B4, a method for braking force distribution and a braking force distributor for a vehicle are known. From DE 196 24 491 C2, a device for controlling the braking force distribution of a vehicle is known. From DE 196 20 584 B4, a method for determining an entry criterion into the electronic braking force distribution is known.

SUMMARY

The aim of the invention is to provide a vehicle brake system and a method for operating the vehicle brake system, wherein a more flawless brake operation compared to the prior art is enabled.

According to the characterizing part of the disclosure, a determination component is associated with the electronic control device of the friction brake system, by means of which a current actual wheel circumference ratio between the front axle wheels and the rear axle wheels of the vehicle can be determined. Taking into consideration the current actual wheel circumference ratio, the electronic control device of the friction brake system determines the front axle target deceleration and the rear axle target deceleration.

For example, in the determination component associated with the control device, a learning algorithm can be stored, which can determine the current wheel circumference ratio between the vehicle axles. For this purpose, the determination component can be connected by signaling to a sensor system, by means of which parameters correlating with the wheel circumference of the front axle and rear axle wheels can be acquired, for example, front axle and rear axle rotational speeds. On the basis of these parameters, the actual wheel circumference ratio can be calculated by means of the learning algorithm.

The actual wheel circumference ratio between the front and rear wheels actually existing in the vehicle is provided by a learning algorithm in the control device.

The sum of the target friction braking torques or of the target friction braking forces or of the target wheel brake pressure on all the wheels can be compensated or scaled particularly preferably by signaling before an axle-specific arbitration or influencing on the basis of the learned actual wheel circumference ratio and the current or desired braking force distribution of the friction brake.

By means of the scaling of the friction braking forces or friction brake moments or brake pressure, in the case of a change of the braking force distribution, depending on the quality of the learning function for the wheel circumference ratio, it is possible to prevent a negative influencing of the longitudinal forces during brake blending or during a dynamic change of the braking force distribution.

Moreover, if the reference wheel of the wheel circumference learning function (i.e., of the determination program component), is matched, for example, using GPS, to the real driving speed, the resulting longitudinal force between tire and driving surface can be calculated even more precisely thereby. This is advantageous above all for driver assistance systems and autonomous driving functions.

To the extent that the total friction braking force (i.e., the friction brake system target deceleration) is scaled as a function of the learned wheel circumference ratio of the axles, the resulting longitudinal force, in the case of a dynamic change of the wheel circumference ratio, can moreover be achieved without actuation of inlet or outlet valves and thus be represented relatively unobtrusively acoustically in the motor vehicle.

In addition, downstream learning functions (for example, learning algorithm for the dynamic friction value between brake lining and brake disk) can take this effect into consideration on the basis of the scaled variables and are not negatively influenced thereby.

In a technical implementation, a function can scale the already coordinated target total wheel brake moment (or alternatively target total wheel braking force or target brake pressure), before it is divided by axle or to individual wheels. As input variables, the following are necessary: the target deceleration wheel torque of the friction brakes (i.e., hereafter the friction brake system target deceleration $V_{RBS}$), the actual distribution of the brake moments (i.e., hereafter the braking force distribution BKV (t)), a factor of the dynamic wheel radius (wheel circumference) of the front axle, with respect to the rear axle or alternatively the front axle as reference axle (i.e., hereafter the wheel circumference ratio k(t)). The wheel-dynamically compensated target deceleration wheel torque (i.e., hereafter the compensated target deceleration $V_{soll,komp}$) of the friction brake can be calculated by the following formula:

$$V_{soll,komp} = V_{RBS} * (BKV(t)/(k(t)+1) - BKV(t))$$

The output signal thus calculated is a virtual target wheel brake moment which can then be divided further to axles and wheels by downstream functions.

Hereafter, aspects of the invention are emphasized again in detail: Thus, the axle-specific braking force distributor unit, on the basis of the braking force distribution stored therein, can divide the friction brake system target deceleration into the rear axle target deceleration and the front axle target deceleration. Preferably, the braking force distribution stored in the axle-specific braking force distributor unit cannot remain consistently constant or invariant during a braking process but instead can vary as a function of driving dynamics variables and/or driving status variables.

The electronic control device of the friction brake system can preferably comprise a compensating unit, by means of which the front axle target deceleration and the rear axle target deceleration can be adapted as a function of the current actual wheel circumference ratio.

In a technical implementation, the respective control element of the vehicle wheel brake can comprise, as hydraulic components, a hydraulic pump and a hydraulic control valve. Therefrom, the electronic control device of the friction brake system (or its wheel-specific braking force distributor unit) generates, as control signals, both a rotational speed signal for the actuation of a pump motor of the hydraulic pump and also a valve control signal for the actuation of the hydraulic control valve. In this case, it is preferable for the compensating unit to be arranged in a signal flow direction upstream of the axle-specific braking force distributor unit. In this case, in the compensating unit, a learning algorithm can be stored, which, on the basis of the friction brake system target deceleration and on the basis of the actual wheel circumference ratio, determines a compensated target deceleration. The compensated target deceleration is applied ox the signal input of the axle-specific braking force distributor unit and processed by signaling there. In the axle-specific braking force distributor unit, the compensated target deceleration specification is divided into the front axle target deceleration and the rear axle target deceleration, and namely taking into consideration the variable braking force distribution.

Thus, according to the invention, the friction brake system target deceleration is scaled as a function of the current actual wheel circumference ratio. Thereby, the resulting longitudinal force, in the case of a dynamic change of the wheel circumference ratio, can preferably occur without direct actuation of the hydraulic control valve of the respective vehicle wheel brake, so that the invention can be represented relatively unobtrusively acoustically in the vehicle.

As mentioned above, the compensating unit can preferably be arranged in the signal flow direction upstream of the axle-specific braking force distributor unit. In this case, the compensation unit, which is arranged upstream in terms of signaling, can determine the compensated friction brake system target deceleration not only on the basis of the friction brake system target deceleration and of the actual wheel circumference ratio but in addition also on the basis of the current variable braking force distribution. The value of the current variable braking force distribution can be fed back by a feedback signal line from the axle-specific braking force distributor unit into the compensating unit.

The invention can be used particularly preferably in an at least partially electrically operated vehicle. In this case, the vehicle comprises, on at least one vehicle axle, an electric drive with an electric machine which can be actuated in a motor operating mode by means of a target acceleration specification. In a recovery operating mode, the electric machine can be part of the vehicle brake system according to the invention. In this case, the vehicle brake system can comprise an adding unit, by means of which, in a case of vehicle deceleration, all the deceleration demands can be added up to a total target deceleration. In addition, the vehicle brake system can comprise a coordinating unit which, on the basis of driving operating parameters, divides the added up total target deceleration into the friction brake system target deceleration and an electric machine target deceleration for the electric machine operating in the generator operating mode.

BRIEF DESCRIPTION OF THE FIGURES

Hereafter, an embodiment example of the invention is described in reference to the accompanying figures. The figures show:

FIG. 1 in a block circuit diagram, a vehicle brake system of an electrically driven vehicle; and FIG. 2 in an additional block circuit diagram, a basic software architecture in an electronic control device of a friction brake system of the vehicle brake system.

DETAILED DESCRIPTION

In FIG. 1, in a rough diagram, a brake system or a brake installation for an at least partially electrically driven vehicle is indicated. In FIG. 1, the brake system is represented only to the extent necessary for understanding the invention. Accordingly, in the block circuit diagrams of FIGS. 1 and 2, the signal processing occurs on the basis of deceleration values $V_{EM}$, $V_{RBS}$, etc. In an actually implemented embodiment variant, the signal processing would instead occur on the basis of physical variables which correlate with the deceleration values (namely, brake pressure, torque and force) and which are commonly used in calculating the actuator actuation (friction brake and electric motor).

Accordingly, both the front wheels VR and also the rear wheels HR of the vehicle respectively comprise a vehicle wheel brake 1. The vehicle wheel brake 1 is made of a brake caliper 3 which can be actuated via a hydraulic cylinder (not shown) and a brake disk 5. For the actuation of the vehicle wheel brake 1, its hydraulic cylinder is pressurized, whereby the brake caliper 3, by means of its brake linings, comes in compressive contact with the brake disk 5.

In FIG. 1, each vehicle wheel brake 1 comprises, as control element, hydraulic components, and namely a hydraulic pump 7 which acts as a pressure buildup actuator, as well as a hydraulic control valve 9. An electronic control device 10 of the friction brake system RBS, in the case of a braking demand, i.e., in the case of a friction brake system target deceleration $V_{RBS}$, generates control signals for the actuation of the vehicle wheel brakes 1. In FIG. 1, the control signals are a rotational speed signal n for the actuation of a pump motor 11 of the hydraulic pump 7 and a valve control signal S for the actuation of the hydraulic control valve 10.

It should be emphasized, that in an actually implemented embodiment variant, as a rule, only a central hydraulic actuator with motor is provided, while the wheel- and axle-selective closed loop control occurs just by the control valves 9. Thereby, the wheel brake pressures cannot be closed loop controlled in an axle-specific manner without a valve actuation.

As apparent moreover from FIG. 1, the vehicle comprises an electrified rear axle HA, wherein the rear wheels HR are driven by means of an electric machine EM. In FIG. 1, the power electronics LE of the electric machine EM is actuated by means of a target acceleration specification B which, in FIG. 1, is generated by actuation of an accelerator pedal 15. In the case of a vehicle acceleration, the electric machine EM works in the motor operating mode. Alternatively, in the case of a vehicle deceleration, the electric machine EM can work as generator in a recovery operating mode.

In FIG. 1, the brake system can be activated by means of a driver-side actuatable brake pedal 15, a driver assistance system 17, an emergency brake system 19 and/or an additional autonomous driving system 21, which are all in signal connection with an adding unit 23. In the adding unit 23, all the braking demands are added up and therefrom a total target deceleration $V_{ges}$ is calculated. The total target deceleration $V_{ges}$ is transmitted in FIG. 1 to a coordinating component 25, in which, as a function of driving operating parameters, the total target deceleration $V_{ges}$ is divided into the friction brake system target deceleration $V_{RBS}$ and into an electric machine target deceleration $V_{EM}$ by means of which the electric machine EM working in the generator operation is actuated in order to achieve a braking effect.

The friction brake system target deceleration $V_{RBS}$ generated in the coordinating unit 25, in FIG. 1, is applied on the signal input of the electronic control device 10, by means of which, during the braking process Δt (FIG. 2), the vehicle wheel brakes 1 on the front axle VA and/or on the rear axle HA are actuated.

In FIG. 1, a determination component 29 is associated with the electronic control device 10 of the friction brake system RBS. In the determination component 29, a current actual wheel circumference ratio k(t) between the front axle wheels VR and the rear axle wheels HR is calculated. For example, in FIG. 1, the rear wheels HR have a wheel diameter $d_{HA}$ which is greater in size than the wheel diameter $d_{VA}$ of the front wheels VR. Taking into consideration the current actual wheel circumference ratio k(t), the electronic control device 10 determines the front wheel target decelerations $V_{VA}$ as well as the rear wheel target decelerations $V_{VA}$, on the basis of which the electronic control device 10 generates the control signals S, n for the actuation of the vehicle wheel brakes 1.

A sensor system 31 is associated with the determination component 29, by means of which the current front axle rotational speed $n_{VA}$ and the current rear axle rotational speed $n_{HA}$ can be acquired. On the basis of these rotational speeds, an evaluation unit 33 of the determination component 29 can determine the actual wheel circumference ratio k(t) and transmit it via a signal line 35 to the electronic control device 10. In FIG. 1, the determination component 29 in addition comprises a converter unit 37, by means of which the front axle rotational speed $n_{VA}$ is used as reference rotational speed $n_{ref}$ in the evaluation unit 33.

In FIG. 2, the software architecture of the electronic control device 10 is indicated in more detail and namely with program components for generating the front wheel target decelerations $V_{VA}$ as well as the rear wheel target decelerations $V_{HA}$ on the basis of which the electronic control device 10 generates the control signals S, n for vehicle wheel brakes 1.

Accordingly, the electronic control device 10 comprises an axle-specific braking force distributor unit 39 and a wheel-specific braking force distributor unit 41. In the axle-specific braking force distributor unit 39, a front axle target deceleration $V_{VA}$ and a rear axle target deceleration $V_{HA}$ are determined from the friction brake system target deceleration $V_{RBS}$. In the wheel-specific braking force distributor unit 41, front wheel target decelerations $V_{VR}$ and rear wheel target decelerations $V_{HR}$ are determined from the front axle target deceleration $V_{VA}$. On the basis of these decelerations, the wheel-specific braking force distributor unit 41 generates the already mentioned control signals S, n by which the hydraulic components 7, 9 of the vehicle wheel brakes 1 can be actuated.

In the axle-specific braking force distributor unit 39, the friction brake system target deceleration $V_{RBS}$ is divided, on the basis of a braking force distribution BKV(t) stored therein, into the front axle target deceleration $V_{VA}$ and into the rear axle target deceleration $V_{HA}$. As apparent from FIG. 1, during the braking process Δt, the braking force distribution BKV(t), as a function of driving dynamics and driving status variables x, z, is not constant but instead varies.

In FIG. 2, a compensating unit 43 is arranged in signal flow direction upstream of the axle-specific braking force distributor unit 39. In the compensating unit 43, a learning algorithm, shown in FIG. 2, is stored, by which, on the basis of the friction brake system target deceleration $V_{RBS}$, of the actual wheel circumference ratio k(t) as well as on the basis of the braking force distribution BKV(t), a compensated target deceleration $V_{RBS,komp}$ is determined. The braking force distribution BKV(t) is fed back via a feedback line 45 from the axle-specific braking force distributor unit 39 to the compensator component 43.

CLAIMS

1. Vehicle wheel brake
3 Brake caliper
5 Brake disk
7 Hydraulic pump
9 Control valve
10 Electronic control device
11 Pump motor
13 Brake pedal 17 Driver assistance system
19 Emergency system
21 Additional autonomous driving system
23 Adding unit
25 Coordinating unit
29 Determination component
31 Sensor system
33 Evaluation unit
35 Signal lines
37 Converter unit
39 Axle-specific braking force distributor unit
41 Wheel-specific braking force distributor unit
43 Compensating unit
45 Feedback line
RBS Friction brake system
x Driving dynamics variables
z Driving status variables
$V_{ges}$ Total target deceleration
$V_{RBS}$ Friction brake system target deceleration
$V_{EM}$ Electric machine target deceleration
$V_{RBS,komp}$ Compensated target deceleration
$V_{VA}$ Front axle target deceleration
$V_{HA}$ Rear axle target deceleration
$V_{VR}$ Front wheel target deceleration
$V_{HR}$ Rear wheel target deceleration
k(t) Actual wheel circumference ratio
S Control valve signal
n Rotational speed signal
$n_{VA}$ Front axle rotational speed
$n_{HA}$ Rear axle rotational speed
$n_{ref}$ Reference rotational speed
EM Electric machine
LE Power electronics
B Acceleration specification
BKV(t) Variable braking force distribution
$d_{VA}$ Front wheel diameter
$d_{HA}$ Rear wheel diameter
γt Braking process
$d_{HA}$ Rear wheel diameter
$d_{VA}$ Front wheel diameter

The invention claimed is:

1. A brake system in a motor vehicle, comprising:
vehicle wheel brakes, on both front wheels and rear wheels, that are configured to be actuated via an electronic control device that has an axle-specific braking force distributor unit configured to determine both a front axle target deceleration and a rear axle target deceleration from a friction brake system target deceleration,
a wheel-specific braking force distributor unit that is configured to:
divide the friction brake system target deceleration into the front axle target deceleration and into the rear axle target deceleration based upon a variable braking force distribution stored in the wheel-specific braking force distributor unit,
determine front wheel target decelerations from the front axle target deceleration, and rear wheel target decelerations from the rear axle target deceleration, and
generate control signals for the actuation of the vehicle wheel brakes, wherein the electronic control device is further configured to:
determine a current actual wheel circumference ratio between the front wheels and the rear wheels, and
determine the front wheel target decelerations and the rear wheel target decelerations taking into consideration the current actual wheel circumference ratio.

2. The brake system according to claim 1, further comprising:
a sensor system configured to acquire both a front axle rotational speed and a rear axle rotational speed; and
an evaluation unit in the electronic control device that is configured to determine the actual wheel circumference ratio based upon the front axle rotational speed and the rear axle rotational speed.

3. The brake system according to claim 2, wherein the braking force distribution is configured to vary as a function of driving dynamics and/or driving status variables during a braking process.

4. The brake system according to claim 2, wherein the electronic control device of the friction brake system further comprises:
a compensating unit that is configured to adapt the front wheel target decelerations, and rear wheel target decelerations determined in the control device.

5. The brake system according to claim 2, further comprising:
an electric machine that is configured to drive at least one vehicle axle and is configured to be actuated in a motor operating mode by a target acceleration specification and, in a recovery operating mode, the electric machine is part of the vehicle brake system.

6. The brake system according to claim 1, wherein the braking force distribution is configured to vary as a function of driving dynamics and/or driving status variables during a braking process.

7. The brake system according to claim 6, wherein the electronic control device of the friction brake system further comprises:
a compensating unit that is configured to adapt the front wheel target decelerations, and rear wheel target decelerations determined in the control device.

8. The brake system according to claim 6, further comprising:
an electric machine that is configured to drive at least one vehicle axle, and is configured to be actuated in a motor operating mode by a target acceleration specification and, in a recovery operating mode, the electric machine is part of the vehicle brake system.

9. The brake system according to claim 1, wherein the electronic control device of the friction brake system further comprises:
a compensating unit that is configured to adapt the front wheel target decelerations and the rear wheel target decelerations.

10. The brake system according to claim 9, further comprising:
an electric machine that is configured to drive at least one vehicle axle and is configured to be actuated in a motor operating mode by a target acceleration specification and, in a recovery operating mode, the electric machine is part of the vehicle brake system.

11. The brake system according to claim 9, wherein the compensating unit is arranged in a signal flow direction upstream of the wheel-specific braking force distributor unit, and the compensating unit, on the basis of the friction brake system target deceleration and of the actual wheel circumference ratio, is configured to determine a compensated target deceleration which is applied on the signal input of the wheel-specific braking force distributor unit and processed there.

12. The brake system according to claim 11, wherein the compensating unit is further configured to determine the compensated target deceleration based upon of the braking force distribution.

13. The brake system according to claim 12, further comprising:
an electric machine that is configured to drive at least one vehicle axle, and is configured to be actuated in a motor operating mode by a target acceleration specification and, in a recovery operating mode, the electric machine is part of the vehicle brake system.

14. The brake system according to claim 11, further comprising:
an electric machine that is configured to drive at least one vehicle axle, and is configured to be actuated in a motor operating mode by a target acceleration specification and, in a recovery operating mode, the electric machine is part of the vehicle brake system.

15. The brake system according to claim 1, further comprising:
an electric machine that is configured to drive at least one vehicle axle, and is configured to be actuated in a motor operating mode by a target acceleration specification, and, in a recovery operating mode, the electric machine is part of the vehicle brake system.

16. The brake system according to claim 15, further comprising
an adding unit which, in a case of vehicle deceleration, is configured to add up all the deceleration demands from a brake pedal, a driver assistance system, an emergency brake system and/or an additional autonomous driving system, to a total target deceleration;
a coordinating unit which, on the basis of driving operating parameters, is configured to divide the total target deceleration into the friction brake system target deceleration and into an electric machine target deceleration to actuate the electric machine.

* * * * *